(12) United States Patent
Bayer et al.

(10) Patent No.: US 7,529,431 B2
(45) Date of Patent: May 5, 2009

(54) METHOD AND DEVICE FOR RECONSTRUCTING AND REPRESENTING MULTIDIMENSIONAL OBJECTS FROM ONE-DIMENSIONAL OR TWO-DIMENSIONAL IMAGE DATA

(75) Inventors: Dieter Bayer, Unterschleissheim (DE); Bernard Mumm, Mammendorf (DE); Achim Mayer, Munich (DE); Johannes Waldinger, Ottobrunn (DE); Kiyoji Miyamoto, Tokyo (JP)

(73) Assignee: Tomec Imaging Systems GmbH (DE)

( * ) Notice: Subject to any disclaimer, the term of this patent is extended or adjusted under 35 U.S.C. 154(b) by 487 days.

(21) Appl. No.: 10/507,419

(22) PCT Filed: Feb. 6, 2003

(86) PCT No.: PCT/EP03/01192

§ 371 (c)(1),
(2), (4) Date: Sep. 13, 2004

(87) PCT Pub. No.: WO03/077200

PCT Pub. Date: Sep. 18, 2003

(65) Prior Publication Data

US 2005/0123189 A1    Jun. 9, 2005

(30) Foreign Application Priority Data

Mar. 14, 2002 (DE) ................. 102 11 262

(51) Int. Cl.
*G06K 9/36* (2006.01)
*G06T 15/00* (2006.01)
*G06T 17/00* (2006.01)
*G06T 15/10* (2006.01)
*G06T 15/20* (2006.01)

(52) U.S. Cl. ............. 382/285; 345/419; 345/424; 345/427

(58) Field of Classification Search ............ 382/285; 345/419–427; 348/578–580
See application file for complete search history.

(56) References Cited

U.S. PATENT DOCUMENTS

| 4,386,528 A | 6/1983 | Eagle ................... 73/606 |
| 5,105,819 A | 4/1992 | Wollschlager et al. ....... 600/463 |

(Continued)

OTHER PUBLICATIONS

International Preliminary Examination Report; PCT/EP/2003/001192; Nov. 4, 2004.

*Primary Examiner*—Matthew C Bella
*Assistant Examiner*—Randolph Chu
(74) *Attorney, Agent, or Firm*—Cantor Colburn LLP

(57) ABSTRACT

The method/device reconstructs/represents multidimensional objects from one- or two-dimensional image data based on recordings of one- or two-dimensional partial image areas, wherein spatial/positions of individual partial image areas are used along with one- or two-dimensional image information of the individual partial image areas to generate one- or two-dimensional image data, wherein a first group of space elements is generated in a multidimensional voxel space from first space elements which contain multidimensional image information and touch/intersect planes or lines of partial image areas by means of the one- or two-dimensional image data, and wherein a second group of space elements is generated in the multidimensional voxel space from second space elements by means of information transformation from the multidimensional image information of the first group of space elements. The first space elements are defined by means of the partial image areas by arranging these areas in the multidimensional voxel space.

23 Claims, 5 Drawing Sheets

U.S. PATENT DOCUMENTS 5,159,931 A * 11/1992 Pini ........................... 600/443
5,787,889 A *  8/1998 Edwards et al. ............. 600/443
5,924,989 A *  7/1999 Polz ........................... 600/443
6,674,879 B1 *  1/2004 Weisman et al. ............ 382/128

* cited by examiner

METHOD AND DEVICE FOR RECONSTRUCTING AND REPRESENTING MULTIDIMENSIONAL OBJECTS FROM ONE-DIMENSIONAL OR TWO-DIMENSIONAL IMAGE DATA

TECHNICAL FIELD

The present invention relates to a method for reconstructing and representing multidimensional objects and to a device for reconstructing and representing multidimensional objects from one-dimensional or two-dimensional image data.

BACKGROUND OF THE INVENTION

Such methods and devices for reconstructing and representing multidimensional objects from one-dimensional or two-dimensional image data are especially known for reconstructing and representing three-dimensional or four-dimensional volumes from ultrasound images with position data, with an ultrasound transmitter emitting ultrasound waves onto an object and an ultrasound receiver receiving the ultrasound waves reflected from the object. To record the object the ultrasound transmitter or the ultrasound receiver is moved along the object or rotated relatively to the object while individual partial image areas of the object are recorded. Such partial image areas normally correspond to a line-by-line scanning operation (one- or two-dimensional recordings), recording the object line-by-line along a recording direction into which the ultrasound transmitter or the ultrasound receiver is moved. In known ultrasound devices, the images generated in the ultrasound device can further be used digitally or via a video outlet in a post-processing device or in a data processing system. There, the images can be stored or also directly post-processed. Said images are one- or two-dimensional images which, mostly together with their respective position, are available as one- or two-dimensional image data.

During the scanning operation the object to be examined is recorded line-by-line, i.e. individual, mainly parallel lines and "layers" or rotationally symmetric "slices" of the objects are stressed by ultrasound waves and the respective reflected ultrasound waves are received in the ultrasound device. The received ultrasound waves generate image information providing information about the individual layers or slices of the object, i.e. information about where the object for example has less or more densified material areas (e.g. cavities or boundary layers between tissue and liquid).

The individual layers or slices of the object are "piled up" or "strung together" in a data processing system in order to obtain e.g. a three-dimensional representation of the object on the display apparatus. The varying distances of different areas of a layer, i.e. the position of cavities or stronger densified material areas of the object relative to the ultrasound device are obtained by the evaluation of the grey-value information of each layer.

The known methods like e.g. ultrasound methods use a grey-tone grade (threshold) which is either predefined or must still be calculated so as to find contours in the image. The contour information is then stored in an image and, after evaluation of the distances between the ultrasound device or the ultrasound head and the outer contours of the object to be examined, generates a multidimensional image effect. The whole scanning operation spans across a specific area, e.g. the human body, wherein individual layers or slices of the object to be examined are successively recorded line-by-line within the body during the scanning operation. The individual ultrasound images are joined together spatially correct in a subsequent processing step so that the "piling up" of the individual images results in a complete three- or multidimensional image of the object.

These spatial tomographic recording methods of human organs are e.g. known from U.S. Pat. No. 5,105,819 or U.S. Pat. No. 5,159,931. According thereto, in transoesophagic echocardiography, a pivoted endoscopic probe is introduced through the patient's gullet. The ultrasonic detector is integrated in the tip as so-called "phased array". The ultrasound head is thereby either linearly moved or rotated at the tip of the probe so that one layer of the organ is scanned from each angle setting of the rotating ultrasound head or from any displaced position of the probe. One image sequence per layer is recorded, that is to say e.g. one or more motion cycles of the organ, like e.g. a cardiac cycle. After such a sequence has been recorded, the ultrasound head when rotated about a desired angle increment by means of a motor, like e.g. a step or linear motor, is turned further or displaced by hand or linearly displaced during the linear displacement. A data processing system releases the next recording sequence wherein the data processing system can process both the data of the electrocardiogram (ECG) and the breathing and thorax motion (respiratory record).

It is further known to determine the position of the ultrasound head in any location in space during the recording by means of a position sensor. Said position sensor is located at the ultrasound head and is e.g. connected via an electromagnetic field with the data processing systems in such a way that it captures all translatory and rotary degrees of freedom so that the position, direction of motion and speed of the head can always be captured. The recorded one- or two-dimensional images can then later be spatially assigned and the recorded three-dimensional or multidimensional volume can be reconstructed.

The one- or two-dimensional images (e.g. grey-value images in ultrasound recordings) and their respective absolute position in space and/or respective relative position of the individual images with respect to each other result together with the images themselves in the one- or two-dimensional image data by means of which multidimensional objects can be multidimensionally reconstructed. Especially in clinical practice during the recording of ultrasound images it has proven itself to link the recording sequence with the ECG so that each image of a sequence is always recorded at a special phase point during the heartbeat cycle. Thus sequences of three-dimensional images can be generated in moved objects moved or organs inside creatures, which, when strung together, result in a temporarily independent three-dimensional representation of the organ. The motion of the organ can then be watched like a "film", that is to say four-dimensionally.

Conventional methods for reconstructing multidimensional objects from one- or two-dimensional image data generally use the one- or two-dimensional partial image areas, pile them up one after the other in accordance with the respective positions and interpolate the "missing data" between the individual one- or two-dimensional partial image areas by means of conventional, generally analogue but also digital interpolation methods. For example, the contours in the grey-value image of a one- or two-dimensional ultrasound recording are then compared with the contours of a neighbouring grey-value image and, based on a three-dimensional plane polygon e.g. of the third or fifth grade, linked together in order to "fill up" the missing data between the one- or two-dimensional partial image areas.

These conventional methods are time-consuming, require a lot of calculation work and are mostly not suitable for real-time methods, i.e. such methods where the physician for example wants to follow the progress of the operation in real time by means of an ultrasound during the operation itself.

SUMMARY OF THE INVENTION

The invention improves conventional methods and devices for reconstructing and representing multidimensional objects from one- or two-dimensional image data so that that they can be carried out quickly and easily, require less calculation time and fewer processing steps and hence are cheaper and adapted for use in real time.

According to the present invention, the method for reconstructing multidimensional objects from one- or two-dimensional image data uses a multidimensional voxel space, consisting of pre-determinable small space elements which are defined by means of the available one- or two-dimensional image data being generated by partial image areas and the respective e.g. spatial or chronological positions of the individual partial image areas. This definition of the individual space elements of the multidimensional voxel space results from a first group of space elements being generated from first space elements which contain multidimensional image information and touch or intersect planes or lines of partial image areas which were arranged in the multidimensional voxel space.

In a second step, a second group of space elements is generated in a multidimensional voxel space from second space elements by means of information transformation from the multi-dimensional image information of the first group of space elements. Hence, the second group of space elements consists of second space elements in the multidimensional voxel space, which normally neither touch nor intersect the planes or lines of partial image areas from the one- or two-dimensional image data.

The advantage of the first group of space elements is defined as follows: The multidimensional image information of each space element of the first group of space elements is determined by means of that one- or two-dimensional image information which exists at the respective intersection or the point of contact between the respective first space element and the respective line or plane of a partial image area. As soon as the partial image areas are exactly positioned in the multidimensional voxel space, they touch or intersect some of the space elements spanning the voxel space. The space elements intersecting or touching a one- or two-dimensional partial image area are then assigned as first space elements to a first group of space elements.

The following method has turned out to be advantageous as preferred information transformation for the definition of the second group of space elements: The multidimensional, especially spatial and/or chronological distance to the next first space element of the first group of space elements is determined for each second space element which does not yet contain multidimensional image information. Said information will possibly be stored. "Distance" will hereinafter always be understood as the multidimensional distance in the multidimensional voxel space. This is e.g. a three-dimensional distance or a chronological distance (period of time) between planes of first space elements which were recorded at different times or a chronological distance between the individual voxel spaces.

Hence, the second group of space elements contains for each second space element the information about the (multidimensional) distance of each second space element to the next first space element as well as the information for the identification of the respective first space element. The multidimensional image information of each second space element is then determined by the multidimensional image information of the "nearest" first space element.

However, there is no an advantage in determining the multidimensional image information of each second space element when the distance to the next first space element is larger than a pre-determinable maximum spatial and/or chronological distance ($x_{max}$ and $t_{max}$, respectively). This is to prevent that information of the first space elements unintentionally propagates "too far" into the space or that too long periods of time are bridged.

For example, the multidimensional image information of the next first space element can be used as multidimensional image information of each second space element which lies within the maximum spatial or chronological distance to a first space element. The method therefore examines for each second space element being not yet defined, i.e. without information, in the voxel space its distance to the next first space element and takes over the multidimensional image information of said first space element in an identical way. The second group of space elements consists advantageously of second space elements which have also stored as "multidimensional image information" the distance to and a reference number for the plane or line and position of the partial image area, which was used to determine the multidimensional image information of the nearest first space element. Hence, there exists for each second space element a kind of "calculation formula" or reference number consisting e.g. of a distance vector and a first "reference" space element, which refers to one or several special pixels of a partial image area, being captured by the ultrasound record system, for example.

The following is applied as a further advantageous information transformation method for generating the second group of space elements: The distances to two or more first space elements of the first group of space elements are determined from each second space element of the second group of space elements, and the multidimensional image information of each second space element is defined by the multidimensional image information of a pre-determinable number of spatially and/or chronologically "nearest" first space elements. The multidimensional image information of each second space element is e.g. defined by means of the multidimensional image information of a pre-determinable number of first space elements being weighted on the basis of the different distances to the first space elements.

A second advantageous information transformation method is described as follows: A search beam coming off from each first space element and running along a pre-determinable multidimensional direction vector defines those second space elements which are defined by means of the multidimensional image information of that first space element forming the starting point of the search beam. The search beam therefore has its chronological and/or spatial starting point on the plane or line of the partial image area which has been used for determining the multidimensional image information of the first space element. The advantageous search beam also has a maximum spatial and/or chronological length (11) along the pre-determinable multidimensional direction vector.

A search beam coming off from each first space element in a certain angle from the plane of the partial image area which had been used to determine the multidimensional information of the first space element, for example, is defined such that it defines such second space elements of the second group of space elements which are determined by means of the multidimensional image information of the first space element which formed the starting point of the search beam. The search beam then has a given or pre-determinable maximum length and stands especially orthogonally on the plane of the partial image area which defined the starting point.

The information transformation method thus defines the second group of space elements starting from the first space elements of the first group of space elements forming the starting points for the respective search beam. The planes of the partial image areas which defined the first group of space elements thus "beam" into the space and define the second group of space elements.

The second space elements are also advantageously determined by means of the multidimensional image information of another first space element of the first group of space elements forming a target point which is hit by the search beam coming from the starting point of a first space element. This is especially true if the search beam, even within a still predeterminable maximum length (e.g. chronologically or spatially), hits another first space element which was already defined within the first group of space elements with multidimensional image information.

Alternatively, the second space elements can initially be determined in a first step by means of the multidimensional image information of that first space element which forms the starting point of the search beam. In further steps, the second space elements will then be weighted by means of multidimensional image information of further first space elements forming starting points of search beams which also penetrate the second space elements, wherein the weights orientate themselves by the multidimensional distances of each second space element to the respective starting points. This applies for example to rotationally symmetric recordings because e.g. two-dimensional partial image areas are not standing in parallel to each other and orthogonal search beams therefore intersect.

The second space elements can also be advantageously determined by means of the weighted multidimensional image information of the starting point and the target point, wherein the weights orientate themselves by the distances of each second space element lying on the search beam to the starting and target point, respectively. If the starting point has for example the multidimensional image information "three" and the target point the multidimensional image information "five", the second space elements on the search beam between the starting point and the target point coming off from the starting point receive the multidimensional image information "three" towards "four" in the middle between starting and target point and towards "five" shortly before the target point at the further first space element.

The object is advantageously reconstructed and multidimensionally displayed by means of the multidimensional voxel space consisting of the first and second group of space elements, wherein e.g. parts of a reconstructed three-dimensional object can be displayed by means of variable sectional planes.

As soon as the multidimensional voxel space was "filled up" within the given limits of the method according to the invention, arbitrary sectional planes and lines can be laid through said one in order to "peel out" parts of the objects or display them by means of a sectional view. The reconstructed object or parts thereof can also be advantageously displayed or equipped with pre-determinable characteristics like colour or resistance. Denser tissue structures in the human body can e.g. be equipped with a higher "resistance" so that when shown on the display screen a larger reset force is then be applied to an active display device (force-feedback device) when the user "points" to such denser tissue areas.

Certain parts of the reconstructed object, e.g. particular contours, can be marked for visualization on one side of the arbitrary sectional plane by means of the three-dimensional voxel space, while other elements of the three-dimensional voxel space are covert on the respective side of the sectional plane so that a three-dimensional especially coloured representation of parts of a, for example three-dimensional, object occurs. For visualization of certain parts of the reconstructed object, the three-dimensional voxel space is then advantageously divided into two halves on each side of the sectional plane along the sectional plane and displayed congruently to one another or laterally reversed so that the whole object is visible three-dimensionally. Both volume parts can be advantageously animated, represented transparently or four-dimensionally, that is to say they can be reconstructed in the natural motion.

The device according to the invention for reconstructing multidimensional objects from one- or two-dimensional image data uses recordings of one- or two-dimensional partial image areas of the objects, wherein first storage means store the absolute spatial and/or chronological positions of the individual partial image areas in space and/or the relative spatial and/or chronological positions of the individual partial image areas to each other along with the one- or two-dimensional image information of the individual partial image areas for generating one- or two-dimensional image data, wherein second storage means store the first group of space elements which can be generated in a multidimensional voxel space from first, multidimensional image information containing space elements which touch or intersect lines or planes of partial image areas by means of the one- or two-dimensional image data; and wherein third storage means store the second group of space elements which can be generated in the multidimensional voxel space from the second space elements by means of an information transformation from the multidimensional image information of the first group of space elements.

All storage means are advantageously connected to a processor carrying out the above described information transformation on the basis of one of the preferred methods. According to the definition of the first group of space elements and the second group of space elements, i.e. according to the preferably complete definition of all space elements of the multidimensional voxel space, the object is reconstructed and represented by means of a display, wherein calculation means carry out the information transformation of data from the first and the second storage means and store the results in the third storage means.

A preferred use of a method or a device according to the present invention is the multidimensional reconstruction and representation of an organ captured by means of an ultrasound recording method, especially for the representation of the heart of a creature considering the motions of the heart. The device or the method according to the invention can also preferably be used in transthoracal (TTE), intravascular (IVUS) or intraductal (IDUS) sonography or echocardiography.

BRIEF DESCRIPTION OF THE DRAWINGS

Some preferred embodiments of the invention are explained in detail on the basis of the following drawings, wherein.

DETAILED DESCRIPTION OF THE DRAWINGS

Figure 1:
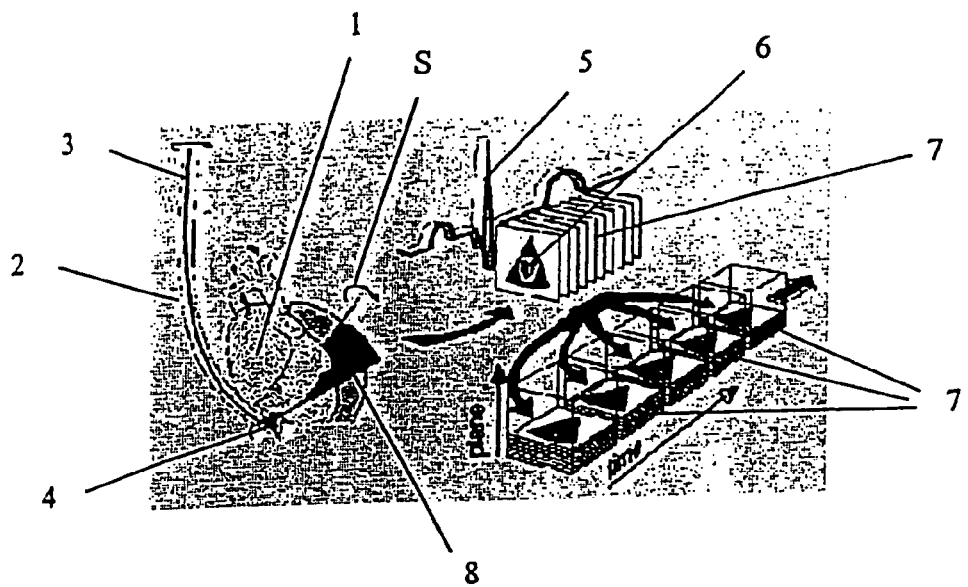
FIG. 1 shows a schematic representation of the recording of a heart.

FIG. 1 shows the schematic view for the recording of an object 1, for example a heart, being recorded transoesophagically. An ultrasound head 4 is then introduced through the gullet 2 by means of a flexible tube 3 in order to obtain recordings 7 of the object 1 in parallel or rotationally symmetric positions. For example, a tomographic ultrasound plane or section 8, formed of ultrasound beams, rotates in the direction of rotation S. The individual partial image areas 6 having a particular distance to each other are triggered by means of an ECG signal and respectively assigned to each other. Piled up, they result in a recording 7 at a particular state of motion of the object 1. The individual recordings 7 can then successively be represented on a display screen of a data processing system, thus resulting in a four-dimensional, i.e. moved multidimensional representation of the object 1.

Figure 2:
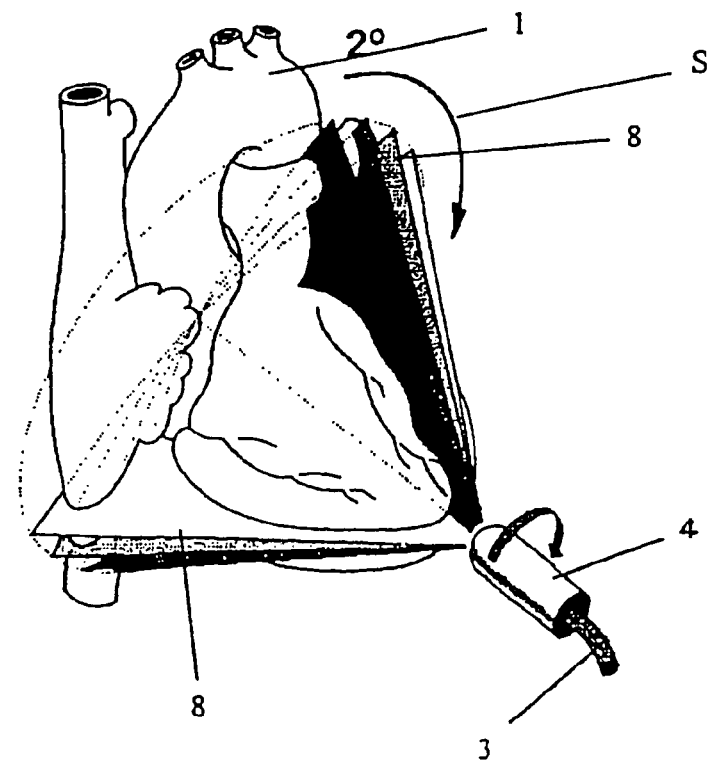
FIG. 2 shows a rotationally symmetric ultrasound converter for the recording of a heart.

FIG. 2 shows a rotationally symmetric ultrasound head 4 connected to a flexible tube 3. The ultrasound head 4 "emits" rotationally symmetric tomographic ultrasound planes or sections 8 formed of ultrasound waves and rotating in rotational direction S in order to record the object 1. The individual layer planes of the rotationally symmetric recordings 7 have a constant or variable distance.

Figures 3, 3A, 3B:
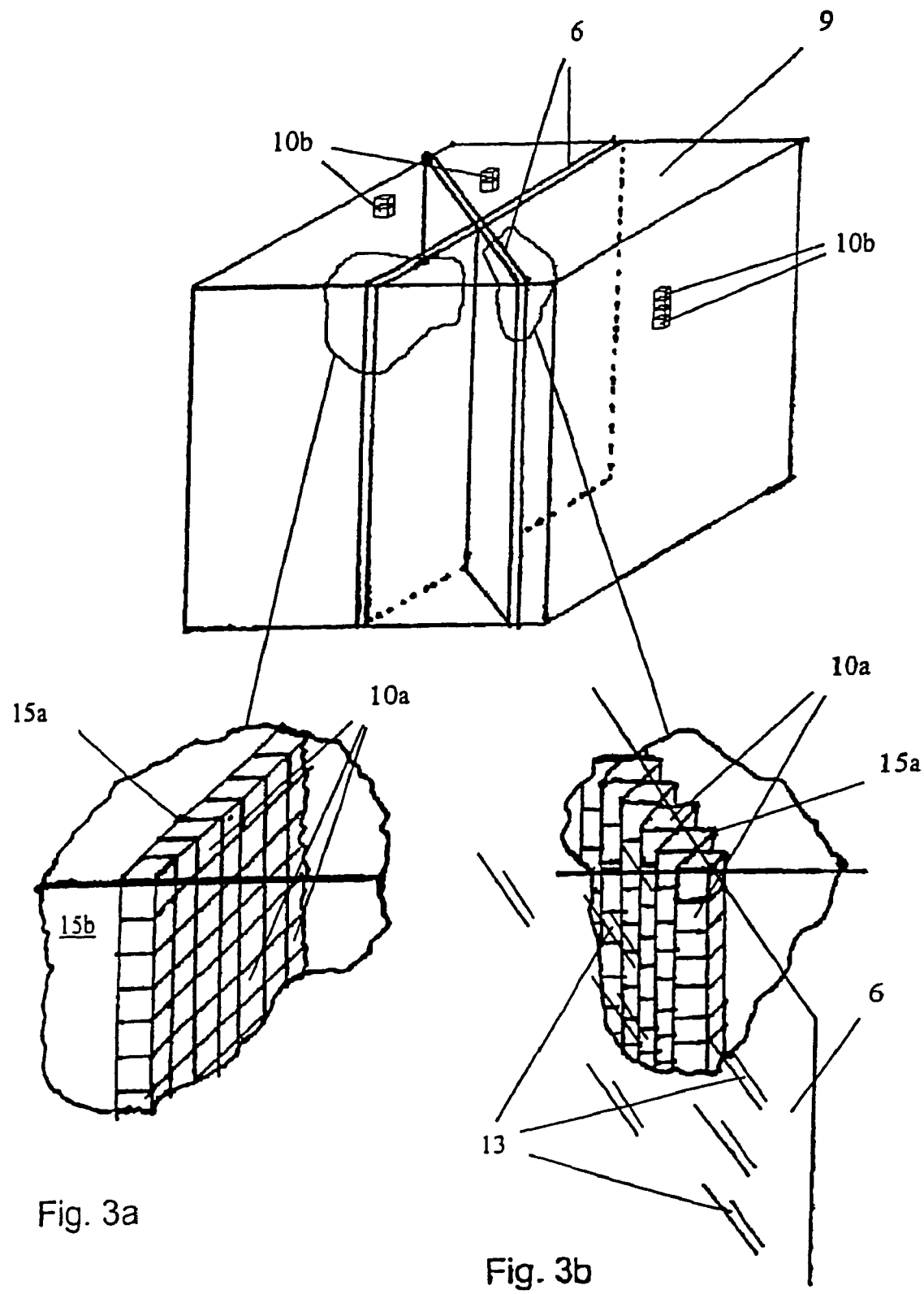
FIG. 3 shows the schematic representation of a three-dimensional voxel space.
FIG. 3a shows a first section from the multidimensional voxel space.
FIG. 3b shows a second section from the three-dimensional voxel space.

FIG. 3 schematically shows the multidimensional voxel space 9, represented three-dimensionally here, into which, shown exemplarily, two two-dimensional partial image areas 6 had been arranged. These partial image areas 6 are for example rotationally symmetric recordings 7 which, as shown in FIG. 2, had e.g. been recorded by an ultrasound head 4 for the recording of a heart. These partial image areas 6 being two-dimensionally here are arranged in the voxel space 9 on the basis of the equally known positions of the partial image areas 6.

FIGS. 3a and 3b show sections of the multidimensional voxel space 9 having first space elements 10a and second space elements 10b. The first space elements 10a form a first group of space elements 15a and thus delimit themselves from the second group of space elements 15b, consisting of second space elements 10b, by intersecting or touching the planes of the partial image areas 6 which had been arranged in the multidimensional voxel space 9. As shown in FIG. 3b a plane of the partial image area 6 intersects or touches space elements of the three-dimensional voxel space 9 and thereby defines the first space elements 10a of a first group of space elements 15a. The individual space elements 10a thereby receive the image information 13 supplied by the two-dimensional partial image area 6. This can be colour or grey-value information, digital or analogue information, numerical values, time values or heuristic values which are respectively taken over in a first space element 10a or which define the space information, i.e. the multidimensional image information of a first space element 10a.

The first and second space elements are "standard cubes" of the multidimensional voxel space 9, that is to say they are voxels spanning the multidimensional space. After all one- or two-dimensional partial image areas 6 had been "spanned" in the multidimensional voxel space 9, i.e. layered or integrated in there, the definition of the first group of space elements 15a takes place by means of the image information 13 of the partial image areas 6.

Figure 4:
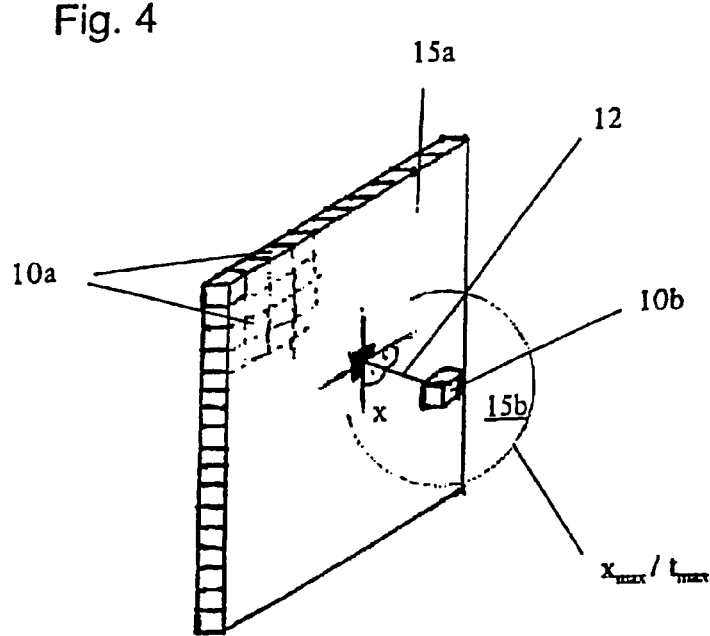
FIG. 4 shows the schematic representation of a first preferred embodiment of the method according to the invention.

After the first group of space elements 15a had been defined, the information transformation takes place to define a second group of space elements 15b consisting of second space elements 10b. A preferred embodiment is shown in FIG. 4. A first preferred embodiment of the method according to the invention is schematically shown here, wherein e.g. the spatial distance to the nearest first, i.e. already defined space element 10a is determined for each second space element 10b. As depicted in FIG. 4, this can for example be a perpendicular 12 hitting a first space element 10a. However, arbitrary angles are also imaginable as long as a first space element 10a is reached within a maximum distance $x_{max}$ or $t_{max}$.

Thus, a "search radius" or a "multidimensional search ball" with the maximum distance $x_{max}$ is put around each second space element 10b and it is asserted whether a first space element 10a lies within this "search ball" in order to then store in the second space element 10b its distance x to the second space element 10b, including the respective image information of the first space element 10a.

Figure 5:
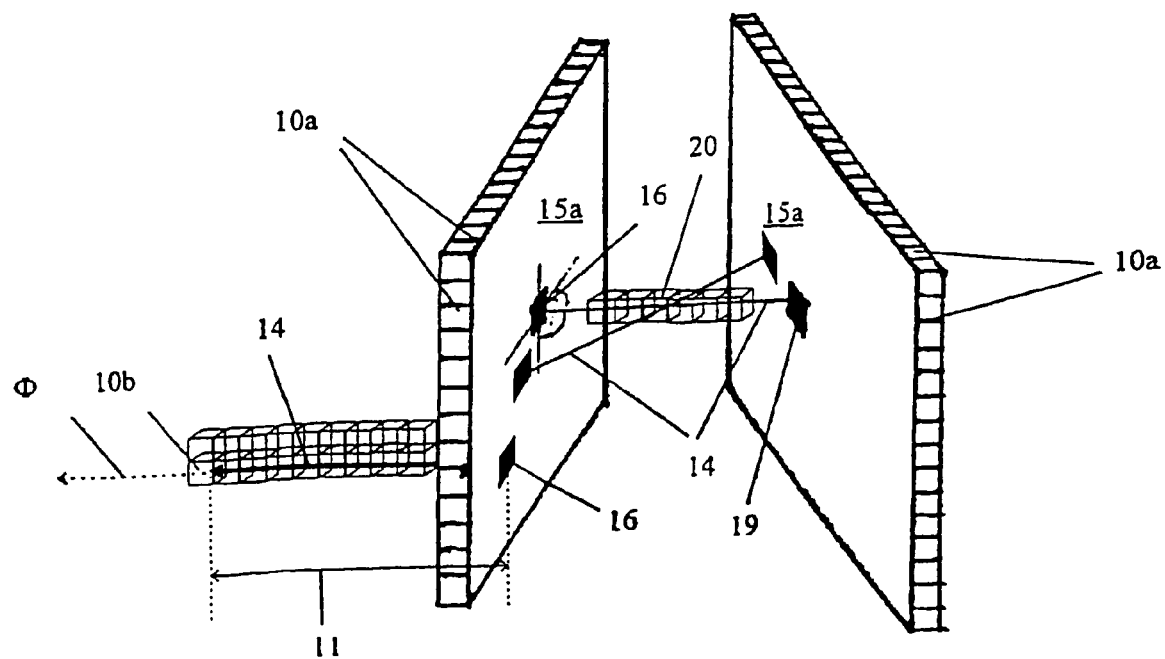
FIG. 5 shows a schematic representation of a second preferred embodiment of the method according to the invention.

FIG. 5 shows another preferred embodiment of the present invention, wherein, starting from each first space element 10a, a search beam 14 is emitted along a pre-determinable multidimensional directional vector Φ and wherein said search beam 14 then defines the second space elements it hits. The advantageous search beam 14 has a maximum length 11 so that all second space elements 10b lying on the search beam 14 up to the maximum length 11 are defined by the multidimensional image information which has the starting point 16, i.e. said first space element 10a which forms the initial point of the search beam 14. As shown in FIG. 5, the search beam 14 can "search" up to a maximum length 11 in case no other first space element 10a is hit or the search beam 14 impinges a further first space element 10a which then forms the target point 19.

The respective second space elements 10b on the search beam 14 between the starting point 16 and the target point 19 can then identically take over either the multidimensional image information of the starting point 16 or the multidimensional image information of the target point 19 or they can take over a weighted multidimensional image information resulting from the weights of the respective distance of the respective second space element 10b to the starting point 16 or the target point 19.

Should a second space element 10b be hit by a further search beam 14 and hence represent a cross element 20, it can also advantageously be determined in a first step by means of the multidimensional image information of that first space element 10a which forms the starting point 16 of the first search beam 14, and it can be weighted in further steps by means of multidimensional image information of further first space elements 10a forming starting points 16 of search beams 14 which also penetrate the cross elements 20, wherein the weights orientate themselves at the multidimensional distances of each second space element 10b (here: cross element 20) to the respective starting points 16 (19).

The method depicted in FIG. 4 is known in a different context as distance transformation method (Distance Transformations in Digital Images, Gunilla Borgefors, Computer Vision, Graphics and Image Processing 34, 344 to 371 (1986)) and defines a method especially suitable for volumes which had been scanned relatively dense, i.e. which comprise plenty of one- or two-dimensional partial image areas 6 within a particular volume. The restriction to a maximum distance $x_{max}$ prevents that the images taken, i.e. two-dimensional partial image areas 6, "spread" too much in volume and result in an unrealistic reconstruction. Advantageously, not the precise Euclidean distance is used but the distance from the already sorted "voxel planes", i.e. such partial image areas 6 which had already been arranged in the three-dimensional voxel space 9.

In the three-dimensional case, a perpendicular 12 runs from each second space element 10b to the "voxel plane" consisting of first space elements 10a, and all space elements between the second space element 10b and the first hit space element 10a are filled with or defined by the three-dimensional image information of the hit first space element 10a. The advantage of said method lies in its simplicity and the resulting speed. Furthermore, it delivers very sharp results because the voxels to be filled are not determined by interpolation, provided that the recorded layers are relatively close to each other. Empirical studies resulted in medium image distances from 1 to approx. 10, advantageously from approx. 2 to 3 voxels.

Another preferred embodiment of the method according to the invention pursuant to FIG. 5 "fills" each second space element 10b, lying between the individual voxel planes, by means of linear interpolation, that is to say, for example, by means of weights from the distances of the respective second space element 10b to the respective voxel plane. After that, the individual second space elements 10b are no longer interpolated with other "beams" which possibly "intersect" the already defined second space elements 10b.

A further preferred embodiment of the method according to the invention pursuant to FIG. 5 "fills" each second space element 10b, lying between the individual voxel planes, by means of the information of the first space element 10a which forms the starting point of the search beam. After that, two cross elements 20 are interpolated with further "beams" which "intersect" the already defined second cross elements 20.

The advantage of this method, in return, is the simplicity and the resulting speed. It is especially suitable for parallel and pivoted movements, first of all when the layers are relatively far away from each other.

Figure 7:
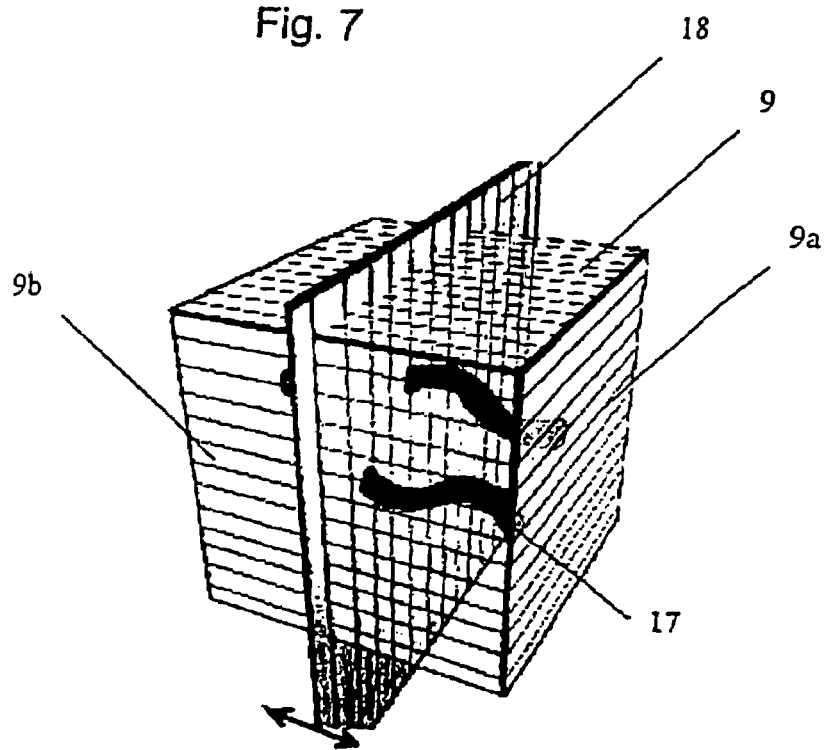
FIG. 7 shows the multidimensional representation of a reconstructed object with sectional plane.
Figure 8:
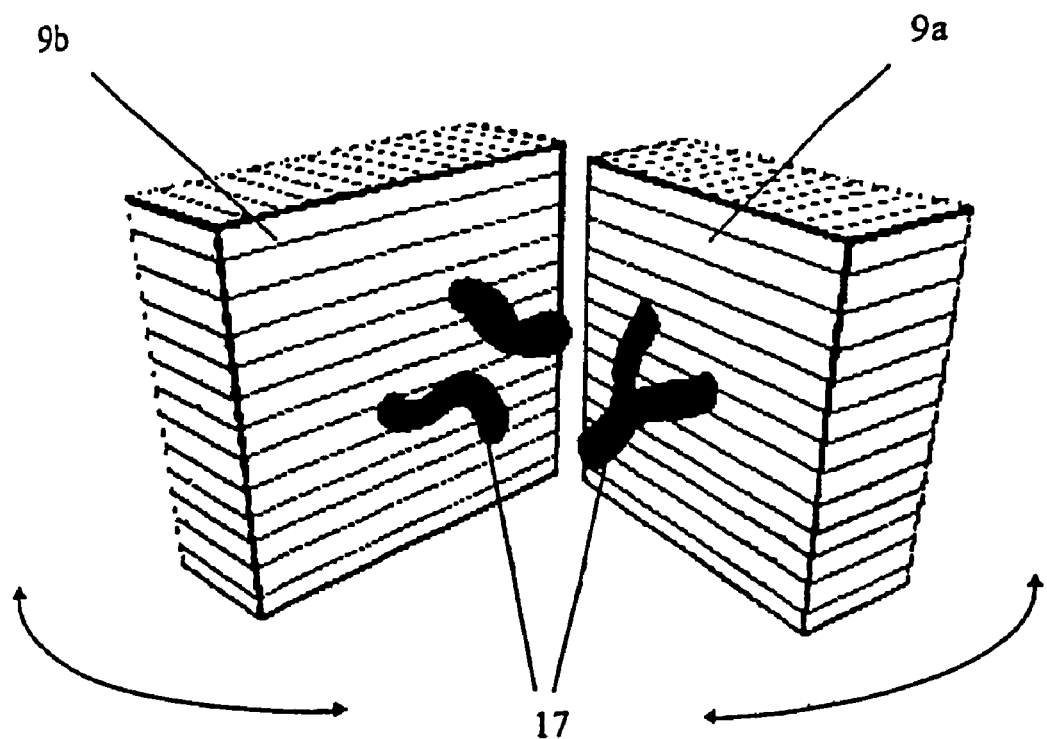
FIG. 8 shows the multidimensional representation of a reconstructed object with the separate and pivoted representation of both sides of the sectional plane.

The present method is particularly suitable for the representation of the reconstructed multidimensional objects because the voxel space 9 is defined by the first and second group of space elements 15a and 15b. These possibilities of representation are shown in FIGS. 6, 7 and 8.

Figure 6:
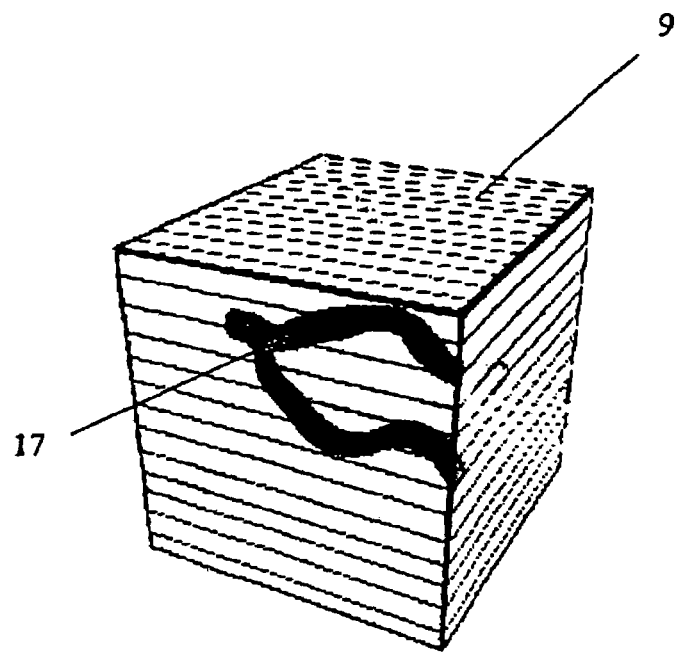
FIG. 6 shows the multidimensional representation of a reconstructed object.

FIG. 6 particularly shows a multidimensional voxel space 9 spanned by the first group of space elements 15a and the second group of space elements 15b and in which a reconstructed object 17 is located. As shown in FIG. 7, a sectional plane 18 can be arbitrarily laid through the reconstructed object 17, wherein said sectional plane can also be displaced or turned into any direction. The sectional plane 18 parts the multidimensional voxel space 9 in a right partial voxel space 9a and a left partial voxel space 9b. In FIG. 8, the right partial voxel space 9a is shown in the sectional representation in such a way that the reconstructed object 17 of the left partial voxel area 9b can be seen multidimensionally. Likewise, the left partial voxel space 9b is shown with that part of the reconstructed object 17 which was originally located in the right partial voxel space 9a. By displacing the sectional plane 18, partial views of the object can be shown separately, wherein the whole object is always visible. The individual partial areas can be arbitrarily pivoted and displaced in order to visualise partial views of the object.

This method is particularly suitable for the representation of coloured, reconstructed volumes. The present method of representation by means of the multidimensional voxel space 9 benefits from the fact that all space elements or almost all space elements 10a, 10b are known in the voxel space 9 are known and therefore, arbitrary sectional views can be represented multi-dimensionally without certain parts of the reconstructed object being "cut away". Particular colour portions of the reconstruction can be "peeled out", whereas others stay covert. Both volume parts can advantageously be animated, represented transparently or four-dimensionally, that is to say reconstructed in the natural motion.

The invention claimed is:

1. Method for reconstructing multidimensional objects from one- or two-dimensional image data, comprising: using a processor to perform
   recording one- or two-dimensional partial image areas of an object; and
   using absolute positions of individual partial image areas in space and/or relative positions of the individual partial image areas to each other along with one- or two-dimensional image information of the individual partial image areas for generating one- or two-dimensional image data;
   wherein a first group of space elements is generated in a multidimensional voxel space from first space elements which contain multidimensional image information and touch or intersect planes or lines of the partial image areas by the one- or two-dimensional image data;
   wherein a second group of space elements is generated in the multidimensional voxel space from second space elements by an information transformation from the multidimensional image information of the first group of space elements;
   wherein said information transformation includes at least one search beam running from each first space element along a pre-determinable multidimensional direction vector, thereby defining those second space elements determined by the multidimensional image information of that first space element which forms a staffing point of the search beam; and
   wherein the search beam has a chronological and/or spatial staffing point on the plane or line of the partial image area used to determine the multidimensional image information of the first space element, and the search beam has a maximum spatial and/or chronological length along the pre-determinable multidimensional direction vector;
   wherein the second space elements are determined in a first step by the multidimensional image information of that first space element which forms the starting point of the search beam, and the second space elements are weighted in further steps by multidimensional image information of further first space elements which form starting points of search beams which also penetrate the second space elements, wherein the weights orientate themselves at multidimensional distances of each second space element to the respective starting points.

2. Method according to claim 1, wherein the multidimensional image information of each first space element is determined by one- or two-dimensional image information which exists at a particular interface/point of contact of a respective first space element with a respective plane or line of the partial image area.

3. Method according to claim 1, wherein a spatial and/or chronological distance from each second space element to the next first space element of the first group of space elements is determined, and the multidimensional image information of each second space element is determined by the multidimensional image information of a spatially and/or chronologically nearest first space element.

4. Method according to claim 3, wherein the multidimensional image information of each second space element is not determined when the spatial and/or chronological distance to the nearest first space element is larger than a predeterminable maximum spatial and/or chronological distance.

5. Method according to claim 4, wherein the multidimensional image information of the spatially and/or chronologically nearest first space element is used as multidimensional image information of each second space element lying within a maximum spatial and/or chronological distance to a first space element.

6. Method according to claim 3, wherein the spatial and/or chronological distance and a reference number for the plane or line of the partial image area used to determine the multidimensional image information of the nearest first space element, is stored as multidimensional image information of each second space element.

7. Method according to claim 1, wherein the spatial and/or chronological distances from each second space element to two or more first space elements of the first group of space elements are determined, and the multidimensional image information of each second space element is determined by the multidimensional image information of a pre-determinable number of spatially and/or chronologically nearest first space elements.

8. Method according to claim 7, wherein the multidimensional image information of each second space element is determined by the multidimensional image information, weighted on the different spatial and/or chronological distances, of a pre-determinable number of first space elements.

9. Method according to claim 1, wherein the second space elements are determined by the multidimensional image information of another first space element of the first group of space elements, which constitutes a target point which is hit by the search beam.

10. Method according to claim 9, wherein the second space elements are determined by weighted multidimensional image information of the staffing point and the target point, wherein the weights orientate themselves at multidimensional distances of each second space element, lying on the search beam, to the staffing or target point.

11. Method according to claim 1, wherein the object is reconstructed and represented multidimensionally by the multidimensional voxel space comprising the first and second group of space elements and/or wherein parts of the reconstructed object are represented by variable sectional planes.

12. Method according to claim 11, wherein the reconstructed object or parts thereof are represented or equipped with pre-determinable characteristics like color or resistance.

13. Method according to claim 11, wherein certain parts of the multidimensional voxel space are marked and sampled for representation on one side of an intersectional plane in order to visualize certain parts of the reconstructed object.

14. Method according to claim 11, wherein the multidimensional voxel space is sampled by an intersectional plane into at least two halves to visualize certain parts of the reconstructed object, and wherein the intersectional plane and/or the at least two halves are pivotable and/or rotatable and/or displaceable in different multidimensional directions.

15. Device for reconstructing multidimensional objects from one- or two-dimensional image data, on basis of recordings of one- or two-dimensional partial image areas of an object, comprising:

first storage means for storing absolute spatial and/or chronological positions of the individual partial image areas and/or relative spatial and/or chronological positions of the individual partial image areas to each other along with one- or two-dimensional image information of the individual partial image areas for generating one- or two-dimensional image data;

second storage means for storing a first group of space elements which can be generated in a multidimensional voxel space from first multidimensional image information containing first space elements touching or intersecting planes or lines of partial image areas by the one- or two-dimensional image data;

third storage means for storing a second group of space elements generated in the multidimensional voxel space from second space elements by an information transformation from the multidimensional image information of the first group of space elements;

wherein the device is configured for creating a search beam that has a chronological and/or spatial staffing point on the planes or lines of the partial image area used to determine the multidimensional image information of the first space element, and the search beam has a maximum spatial and/or chronological length along the pre-determinable multidimensional direction vector;

wherein the second space elements are determined in a first step by the multidimensional image information of that first space element which forms the staffing point of the search beam, and the second space elements are weighted in further steps by multidimensional image information of further first space elements which form starting points of search beams which also penetrate the second space elements, wherein the weights orientate themselves at multidimensional distances of each second space element to the respective starting points.

16. Device according to claim 15, wherein the object is reconstructed and represented in a display by spanning the multidimensional voxel space by the first and second group of space elements.

17. Device according to claim 15, wherein calculation means carry out the information transformation from data of the first and second storage means and store the results in the third storage means.

18. Method according to claim 1 further her comprising a multidimensional reconstruction and representation of an organ comprising a heart of a creature, considering motion of a heart.

19. Method according to claim 1, further comprising performing at least one of transthoracal (TTE), transoesophagic (TEE), and intravascular (IVUS) echocardiography and/or intraductal (IDUS) sonography.

20. Device according to claim 15, configured for a multidimensional reconstruction and representation of an organ comprising a heart of a creature, considering the motion of the heart.

21. A device according to claim 15, configured for at least one of transthoracal (TTE), transoesophagic (TEE), and intravascular (IVUS) echocardiography and/or intraductal (IDUS) sonography.

22. Method for reconstructing multidimensional objects from one- or two-dimensional image data, comprising: using a processor to perform recording one- or two-dimensional partial image areas of an object; and using absolute positions of individual partial image areas in space and/or relative positions of the individual partial image areas to each other along with one- or two-dimensional image information of the individual partial image areas for generating one- or two-dimensional image data;

wherein a first group of space elements is generated in a multidimensional voxel space from first space elements which contain multidimensional image information and touch or intersect planes or lines of the partial image areas by the one- or two-dimensional image data;

wherein a second group of space elements is generated in the multidimensional voxel space from second space elements by an information transformation from the multidimensional image information of the first group of space elements;

wherein the spatial and/or chronological distance from each second space element to the next first space element of the first group of space elements is determined;

wherein the multidimensional image information of each second space element is determined by means of the multidimensional image information of the spatially and/or chronologically nearest first space element; and wherein the spatial and/or chronological distance and a reference number for the plane or line of the partial image area, which was used to determine the multidimensional image information of the nearest first space element, is also stored as multidimensional image information of each second space element.

23. Device for reconstructing multidimensional objects from one- or two-dimensional image data, on basis of recordings of one- or two-dimensional partial image areas of an object, comprising:

first storage means for storing absolute spatial and/or chronological positions of the individual partial image areas and/or relative spatial and/or chronological positions of the individual partial image areas to each other along with one- or two-dimensional image information of the individual partial image areas for generating one- or two-dimensional image data;

second storage means for storing a first group of space elements which can be generated in a multidimensional voxel space from first multidimensional image information containing first space elements touching or intersecting planes or lines of partial image areas by the one- or two-dimensional image data;

third storage means for storing a second group of space elements generated in the multidimensional voxel space from second space elements by an information transformation from the multidimensional image information of the first group of space elements;

wherein the device is configured for determining the spatial and/or chronological distance from each second space element to the next first space element of the first group of space elements is determined;

wherein the multidimensional image information of each second space element is determined by means of the multidimensional image information of the spatially and/or chronologically nearest first space element; and wherein the spatial and/or chronological distance and a reference number for the plane or line of the partial image area, which was used to determine the multidimensional image information of the nearest first space element, is also stored as multidimensional image information of each second space element.

* * * * *

UNITED STATES PATENT AND TRADEMARK OFFICE
CERTIFICATE OF CORRECTION

PATENT NO. : 7,529,431 B2  Page 1 of 1
APPLICATION NO. : 10/507419
DATED : May 5, 2009
INVENTOR(S) : Bayer et al.

It is certified that error appears in the above-identified patent and that said Letters Patent is hereby corrected as shown below:

Title page, item (75) inventors: delete "Bernard" and insert --Bernhard--.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,529,431 B2
APPLICATION NO. : 10/507419
DATED : May 5, 2009
INVENTOR(S) : Bayer et al.

It is certified that error appears in the above-identified patent and that said Letters Patent is hereby corrected as shown below:

Title Page, Item (73), Assignee, delete "Tomec Imaging Systems GmbH (DE)" and insert therefor --TOMTEC IMAGING SYSTEMS GMBH (DE)--.

Signed and Sealed this

Twenty-ninth Day of June, 2010

David J. Kappos
*Director of the United States Patent and Trademark Office*